United States Patent
Suefuji et al.

(10) Patent No.: US 10,439,518 B2
(45) Date of Patent: Oct. 8, 2019

(54) VIBRATION-TYPE ACTUATOR, DRIVING METHOD FOR VIBRATION-TYPE ACTUATOR, AND ELECTRONIC APPARATUS EQUIPPED WITH VIBRATION-TYPE ACTUATOR

(71) Applicant: CANON KABUSHIKI KAISHA, Tokyo (JP)

(72) Inventors: Kei Suefuji, Tokyo (JP); Atsushi Kimura, Funabashi (JP); Takao Mori, Tokyo (JP); Satoshi Tsuchiya, Inagi (JP); Akira Shimada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 15/266,511

(22) Filed: Sep. 15, 2016

(65) Prior Publication Data
US 2017/0092837 A1    Mar. 30, 2017

(30) Foreign Application Priority Data
Sep. 30, 2015    (JP) ................. 2015-194141

(51) Int. Cl.
*H02N 2/10* (2006.01)
*H02N 2/00* (2006.01)

(52) U.S. Cl.
CPC ........... *H02N 2/0015* (2013.01); *H02N 2/008* (2013.01); *H02N 2/103* (2013.01)

(58) Field of Classification Search
CPC ....... H02N 2/0015; H02N 2/008; H02N 2/103
(Continued)

(56) References Cited

U.S. PATENT DOCUMENTS

| 5,128,580 A | 7/1992 | Maeno et al. |
| 7,109,639 B2 | 9/2006 | Yamamoto et al. |

(Continued)

FOREIGN PATENT DOCUMENTS

| CN | 105981288 A | 9/2016 |
| JP | 2004-320846 A | 11/2004 |

(Continued)

OTHER PUBLICATIONS

Office Action dated Jun. 25, 2019, in Japanese Patent Application No. 2015-194141.

*Primary Examiner* — Derek J Rosenau
(74) *Attorney, Agent, or Firm* — Venable LLP (57) ABSTRACT

A vibration-type actuator that is capable of reducing an unnecessary vibration during driving includes a vibration body configured by connecting an electro-mechanical energy conversion element and an elastic body. A driven body is in pressure contact with the vibration body. A controller moves the vibration body and the driven body relatively by a vibration that is excited in the vibration body by applying driving voltage to the electro-mechanical energy conversion element so that a difference between a resonance frequency in a natural vibration mode of the vibration body that is higher than an upper limit frequency of a predetermined driving frequency range and that is nearest to the upper limit frequency and a frequency of the driving voltage is greater than a difference between a resonance frequency in a natural vibration mode used for moving the vibration body and the driven body relatively and the frequency of the driving voltage.

7 Claims, 10 Drawing Sheets

(58) Field of Classification Search
USPC .......................................................... 310/317
See application file for complete search history.

(56) References Cited

U.S. PATENT DOCUMENTS

| | | |
|---|---|---|
| 7,187,104 B2 | 3/2007 | Yamamoto et al. |
| 7,245,058 B2 | 7/2007 | Fujimoto et al. |
| 8,669,723 B2 | 3/2014 | Kudo |
| 9,318,980 B2 | 4/2016 | Urano |
| 9,479,087 B2 | 10/2016 | Kudo |
| 9,853,576 B2 | 12/2017 | Kudo |
| 10,270,371 B2 | 4/2019 | Sumioka |
| 2012/0316674 A1 | 12/2012 | Urano |
| 2014/0319966 A1 | 10/2014 | Seki et al. |
| 2016/0020712 A1* | 1/2016 | Ninomiya ............ H02N 2/0015 310/323.03 |
| 2016/0246052 A1 | 8/2016 | Shimada |
| 2016/0329836 A1 | 11/2016 | Sumioka |

FOREIGN PATENT DOCUMENTS

| | | |
|---|---|---|
| JP | 2005-124397 A | 5/2005 |
| JP | 2007-336752 A | 12/2007 |
| JP | 2011-259559 A | 11/2011 |
| JP | 2012-005309 A | 1/2012 |
| JP | 2012-253989 A | 12/2012 |
| JP | 2015-106927 A | 6/2015 |
| JP | 2015-144556 A | 8/2015 |
| WO | 2015/098800 A1 | 7/2015 |

\* cited by examiner

VIBRATION-TYPE ACTUATOR, DRIVING METHOD FOR VIBRATION-TYPE ACTUATOR, AND ELECTRONIC APPARATUS EQUIPPED WITH VIBRATION-TYPE ACTUATOR

BACKGROUND OF THE INVENTION

Field of the Invention

The present invention relates to a vibration-type actuator, a driving method for the vibration-type actuator, and an electronic apparatus equipped with the vibration-type actuator.

Description of the Related Art

There is a known vibration-type actuator that makes a vibration body be in pressure contact with a driven body and moves the vibration body and driven body relatively by a vibration excited in the vibration body (see Japanese Laid-Open Patent Publication (Kokai) No. 2004-320846 (JP 2004-320846A)).

Figure 15:
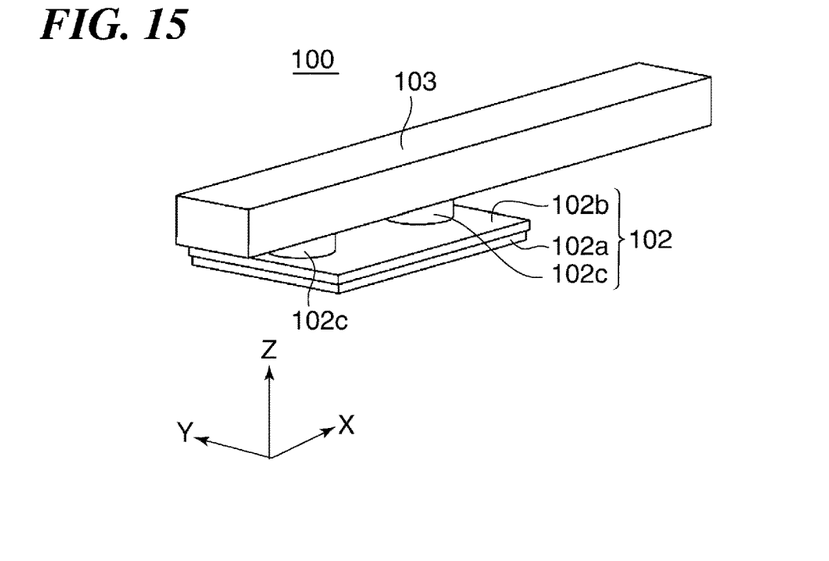
FIG. 15 is a perspective view schematically showing a configuration of a well-known vibration-type actuator.

FIG. 15 is a perspective view schematically showing a configuration of a well-known vibration-type actuator 100. The vibration-type actuator 100 has a vibration body 102 and a driven body 103. The vibration body 102 has an elastic body 102b, two projections 102c disposed on one side of the elastic body 102b, and a piezoelectric device 102a joined to the elastic body 102b at the side opposite to the side on which the projections 102c are disposed.

The two projections 102c are arranged at a predetermined interval in an X-direction. The front ends (upper surfaces) of the projections 10c are in pressure contact with the driven body 103. The elastic body 102b and the two projections 102c are made from metal material, such as stainless steel. The piezoelectric device 102a is adhered to the elastic body 102b with adhesive, for example. A driving circuit (not shown) applies two-phase alternating voltage to the piezoelectric device 102a, and accordingly, vibrations in two bending vibration modes are excited in the vibration body 102. Then, the elliptic motion in the Z-X plane is generated at the front ends of the projections 102c by combining the vibrations excited in the two bending vibration modes. Since the front ends of the two projections 102c are in pressure contact with the driven body 103, the driven body 103 receives friction driving force by elliptic motions of the two projections 102c. Accordingly, the vibration body 102 and the driven body 103 are moved relatively in the X-direction.

A vibration-type actuator drivingly rotates a driven body using the plurality of vibration bodies 102. For example, the three vibration bodies 102 are arranged on the same circumference at regular intervals so that a line that connects two projections 102c of each vibration body coincides with a tangent of the circumference. Accordingly, a disk-shaped or ring-shaped driven body that is in pressure contact with the two vibration bodies 102 rotates (see Japanese Laid-Open Patent Publication (Kokai) No. 2012-5309 (JP 2012-5309A)).

However, the vibration-type actuator using the vibration body 102 may cause an abnormal noise called a "squeal" in a high frequency range at a low driving speed, when the frequency of alternating voltage is swept so as to approach a resonance frequency in a vibration mode used for driving from a frequency higher than the resonance frequency. Specifically, the frictional force between the two projections 102c and driven body 103 causes an unnecessary vibration as a self-excited vibration while sweeping the high frequency side in the driving frequency range. When the unnecessary vibration occurs, the frequency difference between the frequency of the unnecessary vibration and the driving frequency becomes audible, which causes the abnormal noise. Then, when the frequency difference between the resonance frequency in the vibration mode used for driving and the driving frequency is approximately coincident with the frequency difference between the frequency of the unnecessary vibration occurred and the driving frequency, while the driving frequency is further swept toward the low frequency side, the abnormal noise becomes large and the driving also becomes unstable.

SUMMARY OF THE INVENTION

The present invention provides a vibration-type actuator that is capable of reducing an unnecessary vibration during driving.

Accordingly, a first aspect of the present invention provides a vibration-type actuator including a vibration body that is configured by connecting an electro-mechanical energy conversion element and an elastic body, a driven body that is in pressure contact with the vibration body, and a controller configured to move the vibration body and the driven body relatively by a vibration that is excited in the vibration body by applying driving voltage to the electro-mechanical energy conversion element so that a difference between a resonance frequency in a natural vibration mode of the vibration body that is higher than an upper limit frequency of a predetermined driving frequency range and that is nearest to the upper limit frequency and a frequency of the driving voltage is larger than a difference between a resonance frequency in a natural vibration mode used for moving the vibration body and the driven body relatively and the frequency of the driving voltage.

Accordingly, a second aspect of the present invention provides a driving method for the vibration-type actuator, the driving method including a step of moving the vibration body and the driven body relatively by vibration caused in the vibration body by applying driving voltage which has a frequency within a predetermined driving frequency range to the electro-mechanical energy conversion element, and a step of determining a voltage value of the driving voltage so that a difference between a resonance frequency in a natural vibration mode of the vibration body that is higher than an upper limit frequency of the driving frequency range and that is nearest to the upper limit frequency and the frequency of the driving voltage is larger than a difference between a resonance frequency in a natural vibration mode used for moving the vibration body and the driven body relatively and the frequency of the driving voltage.

Accordingly, a third aspect of the present invention provides an electronic apparatus including a component that needs positioning by driving, a moving mechanism that supports the component movably, and the vibration-type actuator of the first aspect that supplies driving force to the moving mechanism.

According to the present invention, the unnecessary vibration during driving of the vibration-type actuator is reduced. This reduces an abnormal noise and enables stable driving.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
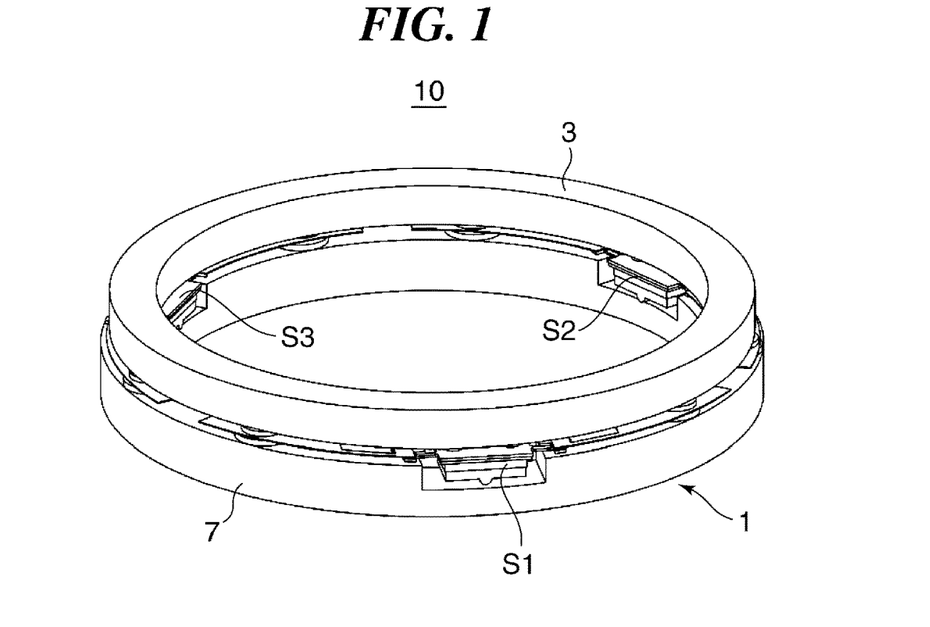
FIG. 1 is a perspective view schematically showing a configuration of a vibration-type actuator according to a first embodiment of the present invention.

FIG. 1 is a perspective view schematically showing a configuration of a vibration-type actuator 10 according to a first embodiment of the present invention. The vibration-type actuator 10 has a ring-shaped driving unit 1 and a ring-shaped driven body 3. A center axis of the driving unit 1 is approximately coincident with a center axis of the driven body 3. The driving unit 1 has three vibration body units S1, S2, and S3 that have the same configuration, and a ring-shaped base 7 that holds the vibration body units S1, S2, and S3. The vibration body units S1, S2, and S3 are arranged so as to divide the circumference of the base 7 into three equal parts approximately.

It should be noted that the number of the vibration body units that constitute the driving unit 1 is not limited to three and may be selected according to a required output characteristic. The number may be one, two, four, or more. When a vibration-type actuator is constituted using one or two vibration body units, it is preferable that a bearing for holding the driven body 3 stably be disposed on the base 7.

Figure 2:
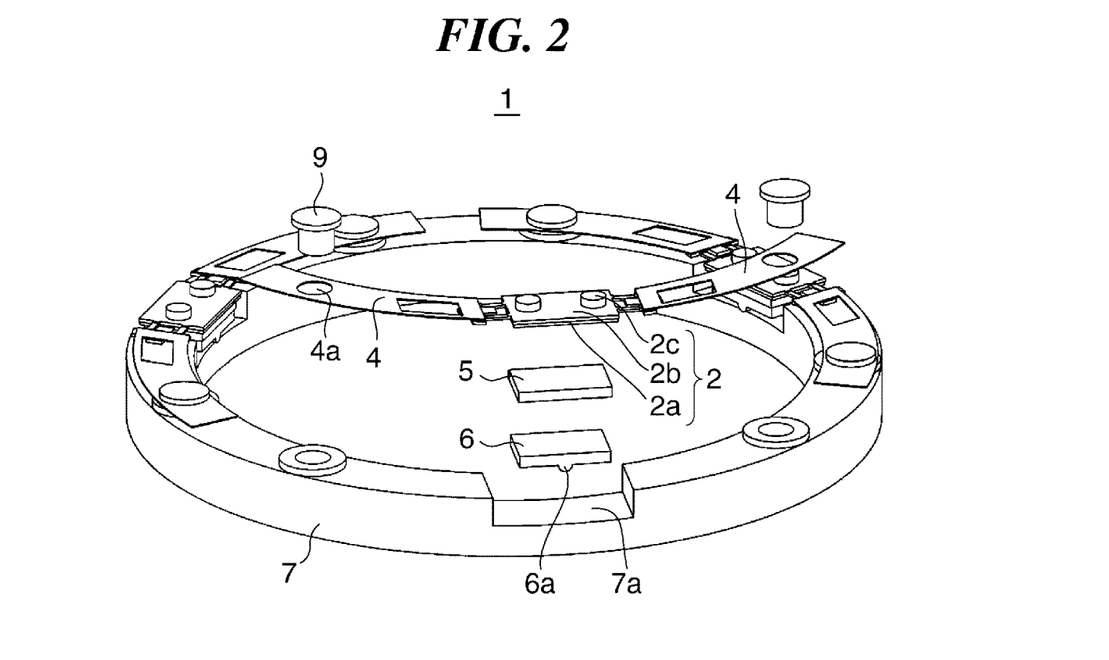
FIG. 2 is a partially exploded perspective view showing a configuration of a driving unit of the vibration-type actuator shown in FIG. 1.

FIG. 2 is a perspective view showing the configuration of the driving unit 1 in a state where the vibration body unit S1 is exploded. Since the three vibration body units S1, S2, and S3 have the same configuration, the vibration body unit S1 is described as follows. The vibration body unit S1 has a vibration body 2, a pair of support members 4, a felt 5, and an equalizing plate 6. The vibration body 2 has an elastic body 2b, two projections 2c disposed on one side of the elastic body 2b, and a piezoelectric device 2a disposed to the elastic body 2b at the side opposite to the side on which the projections 2c are disposed. It should be noted that at least one projection 2c is able to drive the driven body 3.

The elastic body 2b that has an approximately rectangular tabular shape is made from metal material, such as martensitic stainless steel, and quenching treatment has been applied as hardening treatment for improving durability. The projections 2c are formed so as to have thicknesses that have spring property. For example, the projections 2c are integrally formed with the elastic body 2b through press working of the plate material that constitutes the elastic body 2b. However, the manufacturing method is not limited to the press working. The projections 2c may be fixed to the elastic body 2b by welding, etc. Hardening treatment, such as quenching treatment, is applied to the front end sides (upper surfaces) of the projections 2c that frictionally slide relative to the driven body 3 in order to improve antiwear quality. The driven body 3 is made from metal material, such as stainless steel, and hardening treatment, such as nitriding treatment, is applied to the surfaces that frictionally slide relative to the projections 2c in order to improve antiwear quality.

The piezoelectric device 2a that is an electro-mechanical energy conversion element that converts an electrical amount into a mechanical amount is adhered to the elastic body 2b with adhesive. The piezoelectric device 2a has a configuration where electrodes in predetermined shapes are formed on both sides of a plate-shaped piezoelectric ceramic element. A driving circuit (a controller, not shown) applies driving voltage (alternating voltage) at a predetermined frequency to the electrodes of the piezoelectric device 2a to excite vibrations in a first vibration mode and second vibration mode mentioned later in the vibration body 2. The vibrations generate an elliptic motion in a direction that connects the two projections 2c, and an elliptic motion in a projection direction of the projections 2c on the projections 2c. Accordingly, the projections 2c frictionally drive the driven body 3, and the driven body 3 relatively rotates against the driving unit 1 centered on the center axis of the driven body 3.

It should be noted that the vibration body unit S1 is attached to the base 7 so that the line connecting the two projections 2c is coincident with a tangent of the circumference centered on the center axis of the driven body 3. The vibration body units S2 and S3 are attached to the base 7 in the same manner.

The pair of support members 4 are circular elastic members, and connect the vibration body 2 with the base 7. One end of each of the support members 4 in a longitudinal direction is joined to a part of the vibration body 2 (the elastic body 2b) by welding, etc., and the other end in the longitudinal direction is concluded to the base 7 by a fixing screw 9 that passes through a hole 4a. The vibration body 2 is supported at a concave portion 7a formed on the base 7 through the felt 5. The equalizing plate 6 is arranged between the felt 5 and the concave portion 7a of the base 7. The support member 4, felt 5, and equalizing plate 6 function as a pressurizing mechanism that makes the vibration body 2 be in pressure contact with the driven body 3. When the vibration body 2 is accommodated in the concave portion 7a, the projections 2c are in pressure contact with the driven body 3.

A half-cylindrical convex part 6a is formed on the center portion in the longitudinal direction of the bottom surface (the side of the base 7) of the equalizing plate 6 so as to be rotatable against the concave portion 7a of the base 7 in a pitching direction. Since the vibration body 2 rotatably moves against the base 7 in the pitching direction while following the contact surface of the driven body 3, the contact state between the driven body 3 and the projections 2c is stabilized. Accordingly, the driving force is stably given to the driven body 3.

Figure 3A:
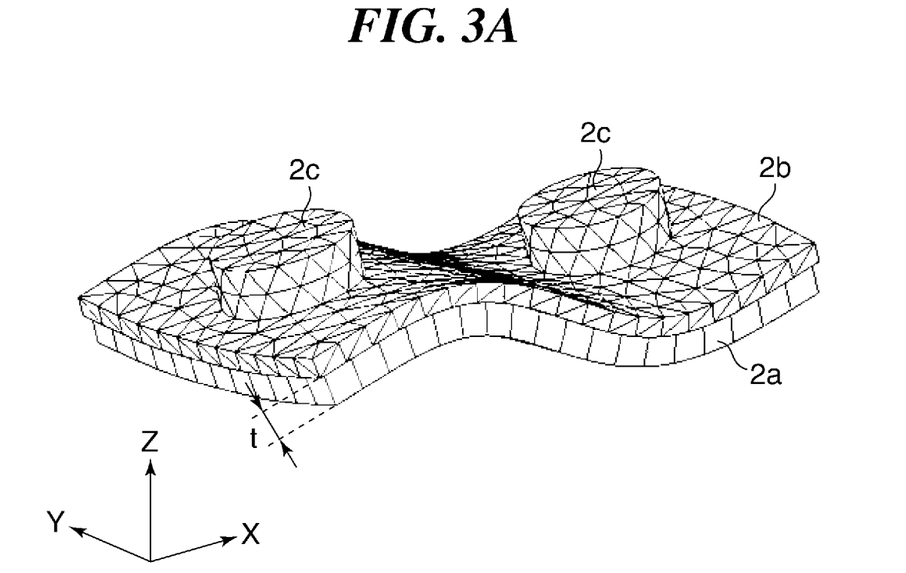
FIG. 3A and FIG. 3B are perspective views that respectively describe a first vibration mode and second vibration mode that are excited in a vibration body of the vibration-type actuator shown in FIG. 1.
Figure 3B:
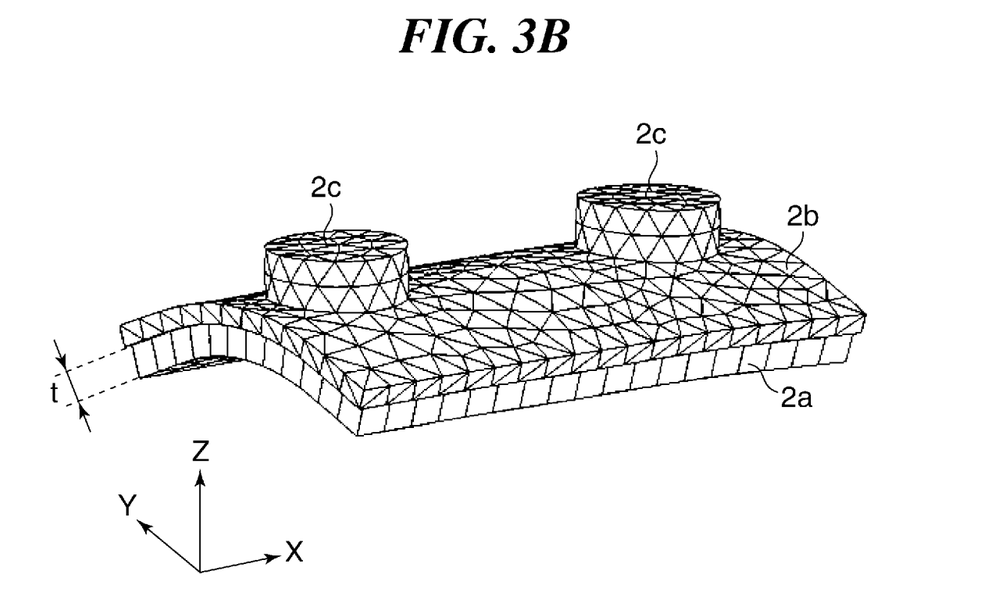

FIG. 3A and FIG. 3B are views describing natural vibration modes that are exited in the vibration body in order to drive the vibration-type actuator 10 (to relatively move the driven body 3 against the driving unit 1). FIG. 3A is a perspective view describing the vibration in the first vibration mode that is excited in the vibration body 2 in order to drive the vibration-type actuator 10. FIG. 3B is a perspective view describing the vibration in the second vibration mode that is excited in the vibration body 2 in order to drive the vibration-type actuator 10. It should be noted that the deformation amounts in FIG. 3A and FIG. 3B are exaggerated as compared with the size of the vibration body 2 in order to facilitate understanding of the deformation shapes. In order to describe the first vibration mode and second vibration mode, an X-direction, a Y-direction, and a Z-direction are defined in the drawings. The X-direction is a direction that connects the two projections 2c. The Z-direction is the projection direction of the projections 2c. The Y-direction intersects with the X-direction and Z-direction at right angles. It should be noted that a thickness t of the piezoelectric device 2a in the Z-direction shown in FIG. 3A and FIG. 3B is mentioned later.

In the first vibration mode, a secondary bending vibration in the X-direction that has three nodes parallel to the Y-direction is generated. The projections 2c reciprocate in the X-direction by the vibration in the first vibration mode. When the projections 2c are arranged near the nodes of the vibration in the first vibration mode, the deformation amounts of the projections 2c in the X-direction are maximized.

In the second vibration mode, a primary bending vibration in the Y-direction that has two nodes parallel to the X-direction is generated. The projections 2c reciprocate in the Z-direction by the vibration in the second vibration mode. When the projections 2c are arranged near the antinode of the vibration in the second vibration mode, the deformation amounts of the projections 2c in the Z-direction are maximized.

Accordingly, when the vibrations in the first vibration mode and second vibration mode are combined, the elliptic motions approximately in the X-Z plane are generated in the front end sides of the projections 2c, which generates the driving force that frictionally drives the driven body 3 approximately in the X-direction. When each of the two projections 2c is arranged at the position that is coincident with the node in the first vibration mode and the antinode in the second vibration mode, the vibration amounts of the projections are maximized. Accordingly, high output power is obtained. In the vibration-type actuator 10, since the directions of the driving forces by the vibration body units S1, S2, and S3 that act on the driven body 3 are respectively coincident with the tangential directions of the same circumference, the driving unit 1 and the driven body 3 rotate relatively.

Figure 4:
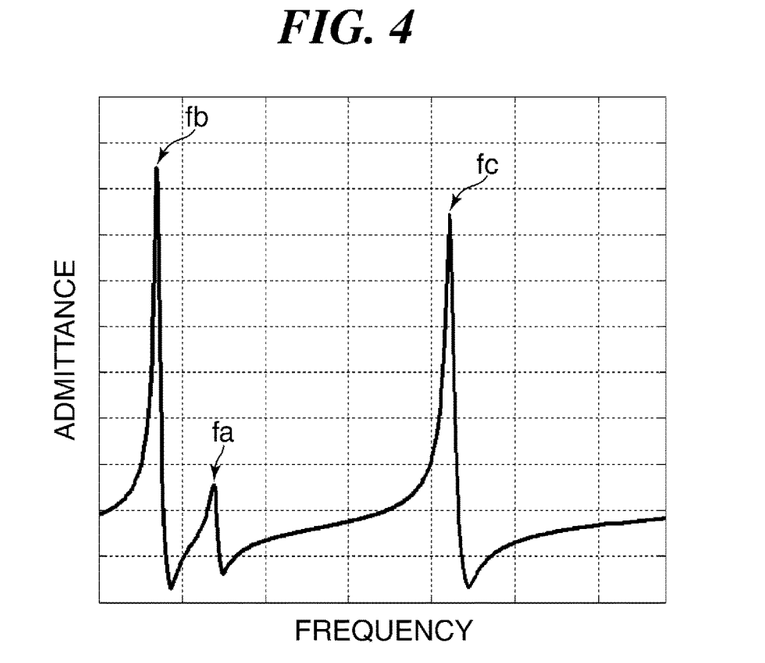
FIG. 4 is a graph showing a frequency-admittance characteristic that appears when a frequency of driving voltage (driving frequency) is swept in a single state where one vibration body of the driving unit shown in FIG. 2 is in a non-pressure state.

FIG. 4 is a graph showing a frequency-admittance characteristic that appears when a frequency of driving voltage applied to the piezoelectric device 2a is swept in a single state where the vibration body 2 is not in pressure contact with the driven body 3 (hereinafter referred to as a "non-pressure state"). There are three peak frequencies fa, fb, and fc in the admittance characteristic of the vibration body 2 in the non-pressure state. The frequency fa is the resonance frequency in the first vibration mode, the frequency fb is the resonance frequency in the second vibration mode, and the frequency fc is the resonance frequency in the vibration mode shown in FIG. 5 (hereinafter referred to as a "third vibration mode").

Figure 5:
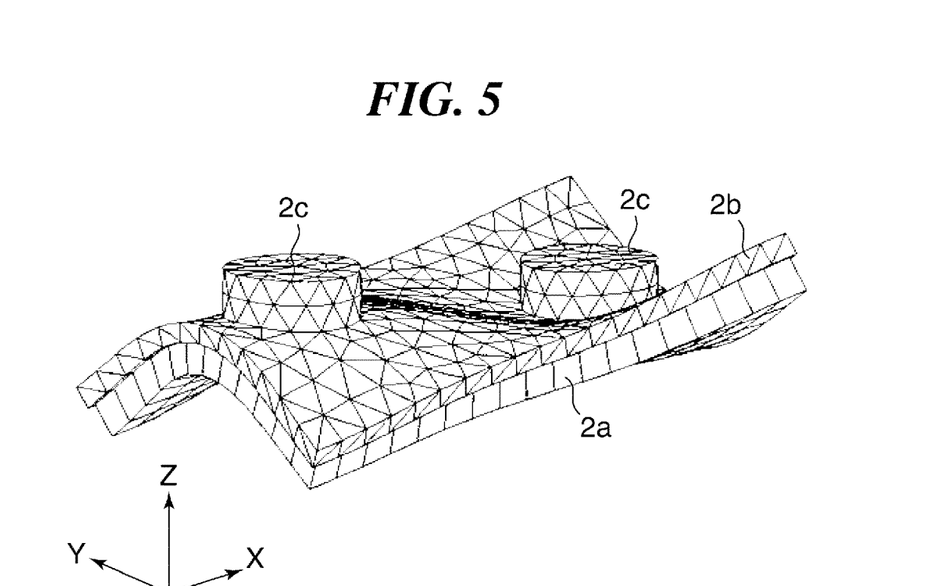
FIG. 5 is a perspective view schematically showing deformation in a third vibration mode that occurs in one vibration body of the driving unit shown in FIG. 2.

FIG. 5 is a perspective view schematically showing deformation in the third vibration mode that occurs in the vibration body 2 in the third vibration mode at the resonance frequency fc. The third vibration mode is one of the natural vibration modes that are able to be excited by applying voltage to the vibration body 2. The vibration of the vibration body 2 in the third vibration mode is a primary bending vibration in the Y-direction of which phase is inverted in the X-direction.

The third vibration mode is one of unnecessary vibrations that is unnecessary to drive the vibration-type actuator 10. The resonance frequency in the third vibration mode is nearest to the upper limit frequency fs among the frequencies in the natural vibration modes of the vibration body 2 during driving within the frequency range higher than the upper limit frequency fs of the driving frequency range of the vibration-type actuator 10. Moreover, the third vibration mode is a natural vibration mode in which resonance frequency is nearest to the resonance frequencies in the two vibration modes used for driving the vibration-type actuator 10 among the natural vibration modes of the vibration body 2 within the frequency range higher than the resonance frequencies in the two vibration modes used for driving.

As shown in FIG. 4, when the driving voltage is applied to the piezoelectric device 2a, the admittance and a Q-value (a Quality factor that shows sharpness of a peak of a characteristic curve) in the third vibration mode are larger than that in the first vibration mode. The resonance frequency becomes higher in order of the second vibration mode, first vibration mode, and third vibration mode.

Figure 6:
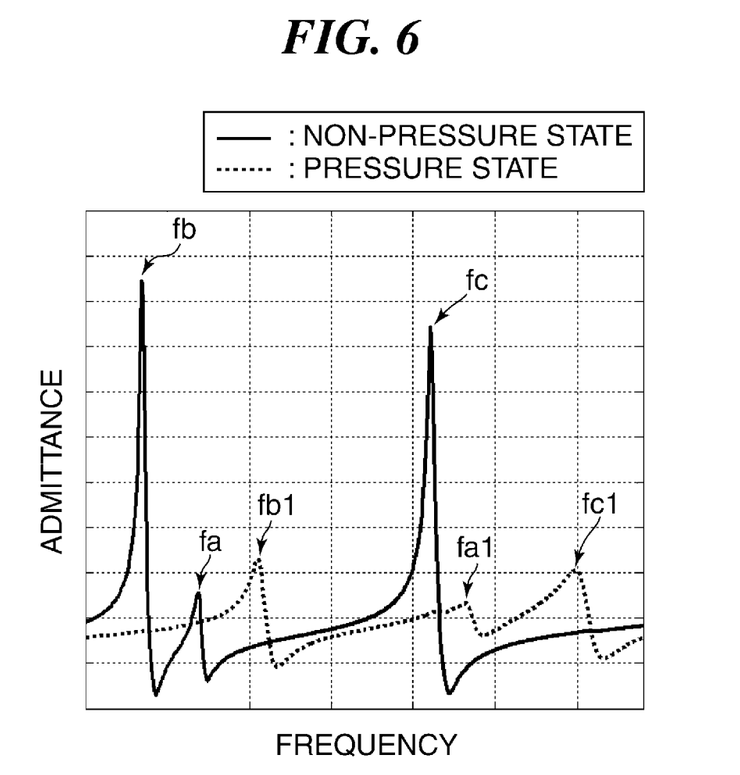
FIG. 6 is a graph showing a frequency-admittance characteristic that appears when the frequency of the driving voltage is swept in a state where one vibration body of the driving unit shown in FIG. 2 is in a pressure state as compared with FIG. 4.

FIG. 6 is a graph showing a frequency-admittance characteristic that appears when the frequency of the driving voltage is swept in a state where the driven body 3 is in pressure contact with the vibration body 2 (hereinafter referred to as a "pressure state") with pressure force P1 as compared with the frequency-admittance characteristic shown in FIG. 4. It should be noted that the pressure force P1 is set to 900 [gf].

In the admittance characteristic in the pressure state, there are three peak frequencies fa1, fb1, and fc1 as shown by a broken line in FIG. 6. The frequencies fa1, fb1, and fc1 are resonance frequencies in the first, second, and third vibration modes, respectively. When the driven body 3 is in pressure contact with the vibration body 2, the resonance frequencies in the first, second, and third vibration modes become higher. The shift amount varies depending on the vibration mode. The largest shift amount is given in the first vibration mode. This is because the motions of the projections 2c are restricted by the pressure contact with the driven body 3 and the effect of the restriction to the projections 2c varies by the vibration mode. Moreover, the admittance and Q value in each of the three vibration modes in the pressure state are lower than that in the non-pressure state. Even in the pressure state, the admittance and the Q value that shows the sharpness of the vibration in the third vibration mode are larger than that in the first vibration mode.

Figure 7A:
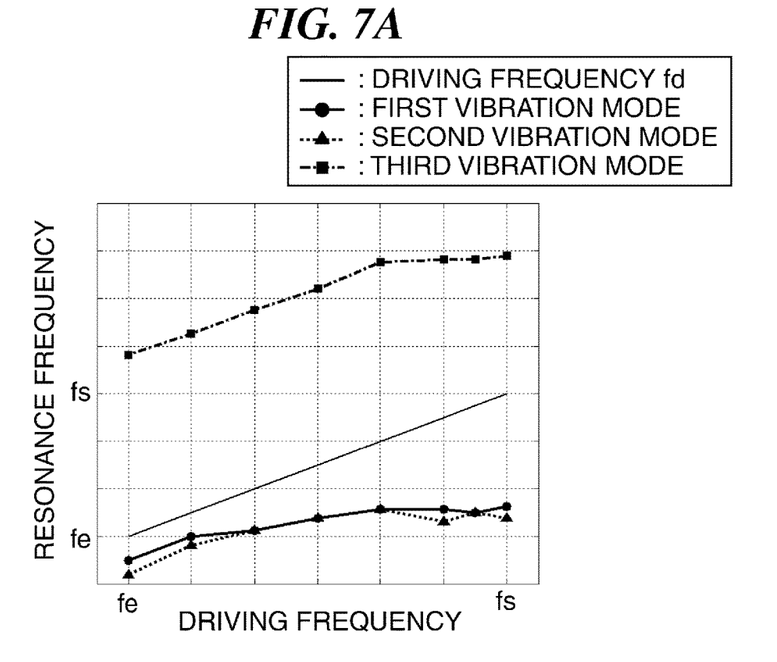
FIG. 7A is a graph showing relations between the driving frequency of the vibration-type actuator shown in FIG. 1 and resonance frequencies of the vibration body in three vibration modes when the vibration body is in pressure contact with the driven body at 900 gf.
Figure 7B:
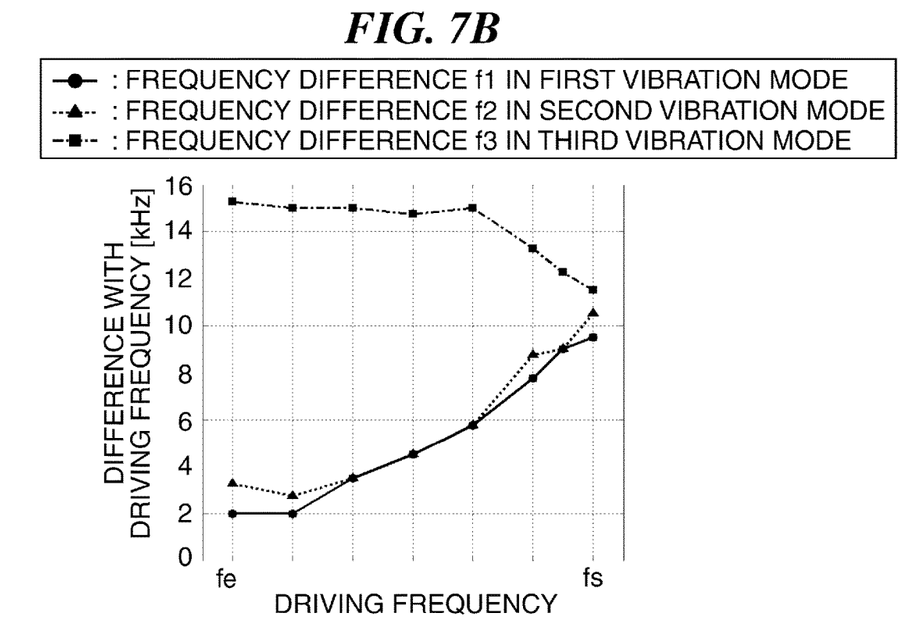
FIG. 7B is a graph showing the relations in FIG. 7A as changes of differences between the resonance frequencies of the vibration body in the three vibration modes and the driving frequency.

FIG. 7A is a graph showing relations between the frequency fd of the driving voltage for driving the vibration-type actuator 10 (hereinafter referred to as a "driving frequency") and the resonance frequencies in the three vibration modes (the first, second, and third vibration modes) of the vibration body 2 when the pressure force P1 is set to 900 [gf]. FIG. 7B is a graph showing the relations in FIG. 7A as changes of differences between the resonance frequencies of the vibration body 2 in the three vibration modes and the driving frequency fd. It should be noted that the vibration-type actuator 10 is driven with the driving voltage (alternating voltage) of which the voltage value V1 is 120 [Vpp] at the driving frequency fd. The driving frequency fd falls within a driving frequency range defined by a lower limit frequency fe and an upper limit frequency fs.

As shown in FIG. 7A, when the driving frequency fd is swept from the upper limit frequency fs to the lower limit frequency fe, the resonance frequencies in the first, second, and third vibration modes become low. This is because when the driving frequency fd becomes lower, the amount of the vibration excited in the vibration-type actuator 10 in each vibration mode becomes larger, which reduces the effect of the restriction to the projections 2c that are in pressure contact with the driven body 3, making the projections 2c approach the non-pressure state.

When the vibration-type actuator 10 is driven, the resonance frequency in the first vibration mode approaches the resonance frequency in the second vibration mode, and is almost equal resonance frequency. Accordingly, a frequency difference f3 between the resonance frequency in the third vibration mode and the driving frequency fd is always larger than a frequency difference f1 between the resonance frequency in the first vibration mode and the driving frequency fd, and a frequency difference f2 between the resonance frequency in the second vibration mode and the driving frequency fd. Thus, when the vibration-type actuator 10 is driven so that the frequency differences f1 and f2 are not coincident with the frequency difference f3 within the entire driving frequency range, the vibration in the third vibration mode that is an unnecessary vibration is reduced. This reduces an abnormal noise called a "squeal" and enables to drive the vibration-type actuator 10 stably.

Figure 8A:
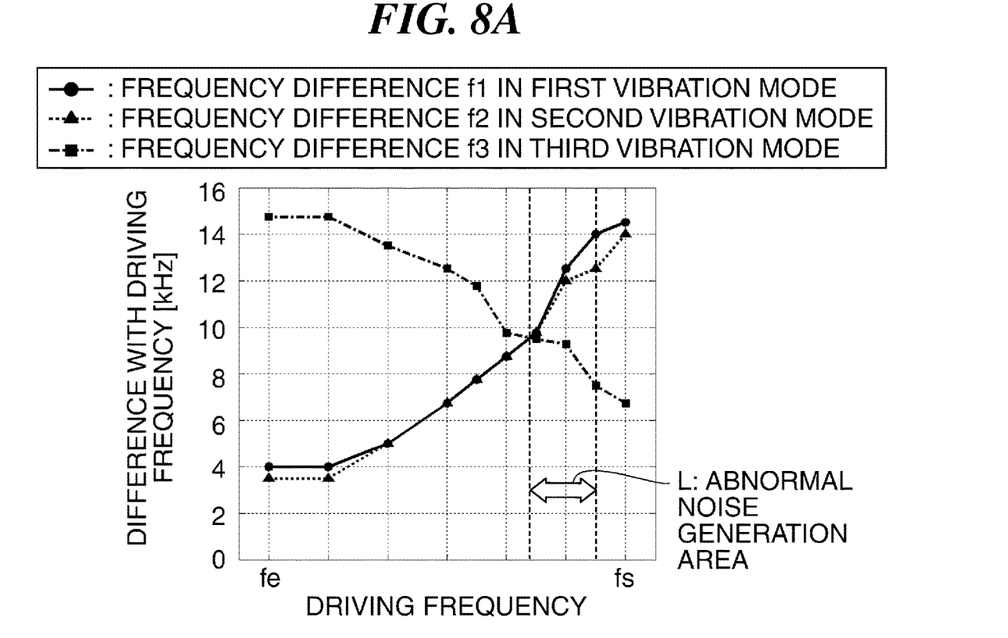
FIG. 8A and FIG. 8B are graphs showing changes of the differences between the resonance frequencies of the vibration body of the vibration-type actuator shown in FIG. 1 in the three vibration modes and the driving frequency when the vibration body is in pressure contact with the driven body at 600 gf and 1200 gf, respectively.
Figure 8B:
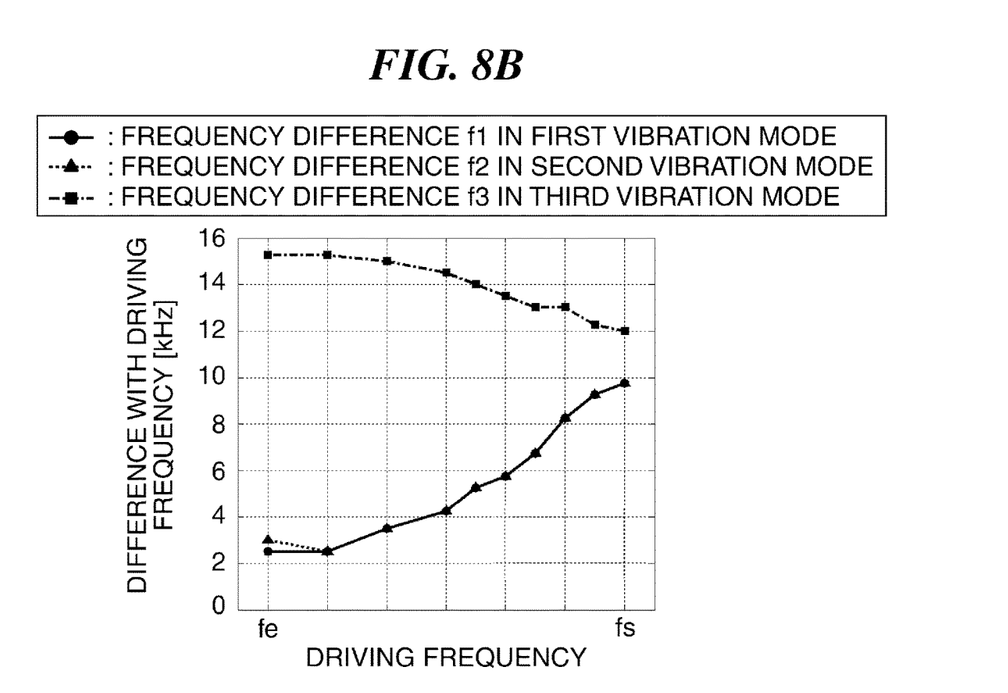

Next, a relation between an effect on the squeal and the intensity of the pressure force P1 that makes the vibration body 2 be in pressure contact with the driven body 3 will be described. FIG. 8A is a graph showing changes of differences between the driving frequency fd of the vibration-type actuator 10 and the resonance frequencies in the three vibration modes (the first, second, and third vibration modes) of the vibration body 2 when the pressure force P1 is set to 600 [gf]. FIG. 8B is a graph showing changes of differences between the driving frequency fd of the vibration-type actuator 10 and the resonance frequencies in the three vibration modes of the vibration body 2 when the pressure force P1 is set to 1200 [gf]. It should be noted that the voltage value V1 of the driving voltage of the vibration-type actuator 10 is set to 120 [Vpp] in order to compare the case where the pressure force P1 is set to 900 [gf] as described with reference to FIG. 7A.

As shown in FIG. 8A, when the pressure force P1 is set to 600 [gf], the frequency difference f3 is smaller than the frequency differences f1 and f2 within the high frequency range near the upper limit frequency fs. Accordingly, the vibration in the third vibration mode is excited as a self-excited vibration in a range L shown by a broken line in FIG. 8A when the vibration-type actuator 10 is driven. Accordingly, the vibration in the frequency difference f3 between the driving frequency fd and the resonance frequency in the third vibration mode occurs as an audible vibration, and the abnormal noise called a squeal occurs. This is because when the vibration amplitude of the vibration body 2 becomes large by sweeping and lowering the driving frequency fd and when the resonance frequency in the third vibration mode nears the driving frequency fd, the vibration in the third vibration mode easily occurs. Particularly, when the frequency difference f1 is approximately coincident with the frequency difference f3 or when the frequency difference f2 is approximately coincident with the frequency difference f3, the vibrations in the first vibration mode and second vibration mode are also excited as self-excited vibrations with large vibration amplitude. Accordingly, the large squeal occurs and the driving of the vibration-type actuator 10 becomes unstable.

Against this, when pressure force P1 is set to 1200 [gf] as shown in FIG. 8B, the frequency difference f3 is always larger than the frequency differences f1 and f2. Thus, when the condition where the frequency differences f1 and f2 are not approximately coincident with the frequency difference f3 holds within the entire driving frequency range, the generation of the squeal is reduced, which enables to drive the vibration-type actuator 10 stably.

When the pressure force P1 increases, the resonance frequencies in the three vibration modes of the vibration body 2 of the vibration-type actuator 10 during driving become higher. Then, the resonance frequencies in the first vibration mode and second vibration mode used for driving the vibration-type actuator 10 approach the driving frequency fd, and the resonance frequency in the third vibration mode goes away from the driving frequency fd on the contrary. Accordingly, when the pressure force P1 is determined so that the frequency difference f3 is always larger than the frequency differences f1 and f2 within the entire driving frequency range, the generation of the squeal is reduced, which enables to drive the vibration-type actuator 10 stably.

Figure 9:
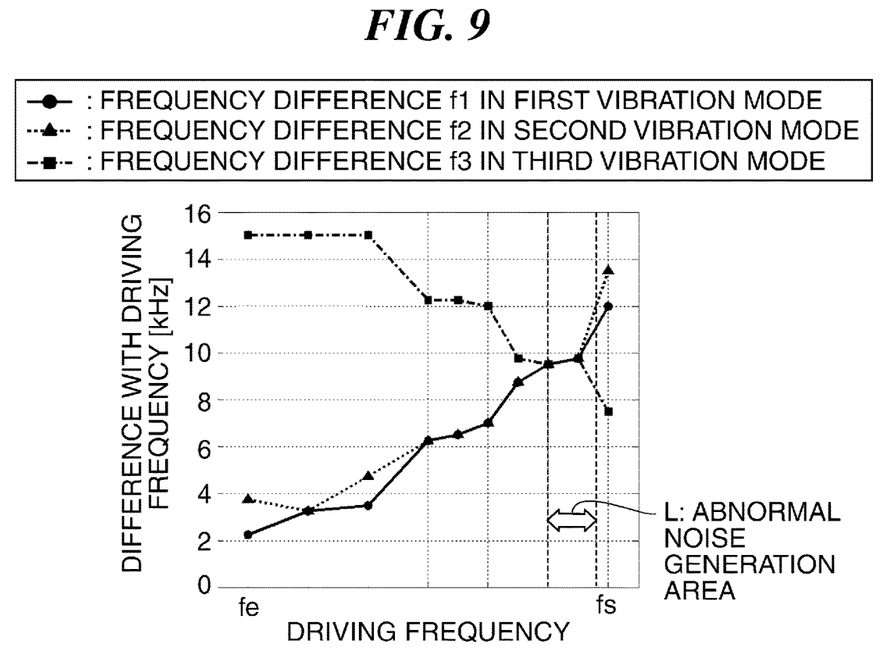
FIG. 9 is a graph showing changes of the differences between the resonance frequencies of the vibration body of the vibration-type actuator shown in FIG. 1 in the three vibration modes and the driving frequency when a voltage value of the driving voltage for the vibration-type actuator is changed.

Next, an effect given to the squeal by the voltage value V1 of the driving voltage for the vibration-type actuator 10 will be described. FIG. 9 is a graph showing changes of the differences between the resonance frequencies in the three vibration modes (the first, second, and third vibration modes) of the vibration body 2 when the voltage value V1 of the driving voltage is set to 180 [Vpp]. It should be noted that the result shown in FIG. 9 appears under the condition where the driven body 3 is in pressure contact with the vibration body 2 with the pressure force P1.

When the voltage value V1 is set to 180 [Vpp], the frequency difference f3 is smaller than the frequency differences f1 and f2 near the upper limit frequency fs where the driving frequency fd is high. Accordingly, the vibration in the third vibration mode is excited as a self-excited vibration in a range L shown by a broken line in FIG. 9 when the vibration-type actuator 10 is driven. Accordingly, the vibration in the frequency difference f3 occurs as an audible vibration, and the abnormal noise called a squeal occurs.

Moreover, when the frequency differences f1 and f2 approach the frequency difference f3, the frequency differences f1 and f2 and the frequency difference f3 vary discontinuously and are approximately coincident like an entrainment phenomenon of a nonlinear oscillation, which maintains the squeal and may make the driving of the vibration-type actuator 10 be unstable. This is based on the following reasons. That is, when the voltage value V1 is enlarged without changing the driving frequency fd of the driving voltage, the amplitude of the vibration that occurs in the vibration body 2 becomes large. This reduces the effect of the restriction to the projections 2c that are in pressure contact with the driven body 3, the resonance frequencies during driving become lower in all the first, second, and third vibration modes. In that case, although the resonance frequencies in the first vibration mode and second vibration mode go away from the driving frequency fd, the resonance frequency in the third vibration mode approaches the driving frequency fd on the contrary. Accordingly, when the voltage value V1 is more than a predetermined value, the frequency difference f3 becomes smaller than the frequency differences f1 and f2, and the squeal occurs.

In the first embodiment, the voltage value V1 of the driving voltage is set so that the frequency difference f3 is always larger than the frequency differences f1 and f2 within the entire driving frequency range (the lower limit frequency fe through the upper limit frequency fs). This reduces a squeal and enables to drive the vibration-type actuator 10 stably.

It should be noted that the driven body 3 is in pressure contact with the vibration body 2 with the pressure force P1 of 900 [gf] and the voltage value V1 of the driving voltage for the vibration-type actuator 10 is set to 120 [Vpp] in the above-mentioned description. However, the constituent condition and the driving condition of the vibration-type actuator 10 are not limited to the above-mentioned description. For example, when the pressure force P1 and the voltage value V1 are combined so that the frequency difference f3 is always larger than the frequency differences f1 and f2 in the driving frequency range, generation of a squeal is reduced. Specifically, when the durability performance of the vibration-type actuator 10 is high, the pressure force P1 is set to a value larger than 900 [gf] and the voltage value V1 is set to a value larger than 120 [Vpp]. Accordingly, since the decrease in the resonance frequency in each vibration mode due to the increase in the voltage value V1 is offset by the increase in the pressure force P1, the frequency differences f1 and f2 are not coincident with the frequency difference f3, which enables to drive the vibration-type actuator 10 stably. Moreover, when the pressure force P1 and the voltage value V1 increase, there is an advantage of increasing the output of the vibration-type actuator 10.

Figure 10:
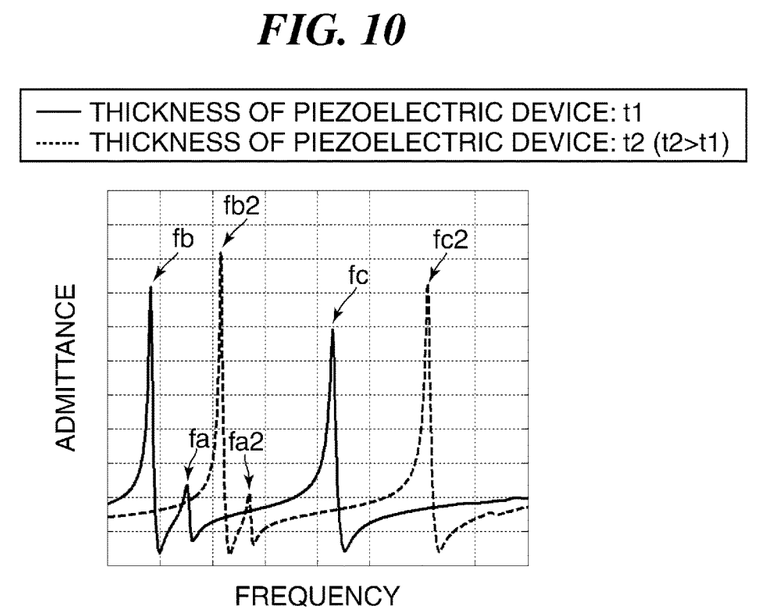
FIG. 10 is a graph showing a frequency-admittance characteristic that appears when the frequency of the driving voltage is swept in a pressure state of one vibration body that constitutes the driving unit shown in FIG. 2.

Next, an effect given to the squeal by the thickness t (see FIG. 3A and FIG. 3B) of the piezoelectric device 2a that constitutes the vibration body 2 will be described. FIG. 10 is a graph showing a frequency-admittance characteristic that appears when the frequency of the driving voltage applied to the piezoelectric device 2a is swept in the non-pressure state of one vibration body 2. In FIG. 10, a solid line indicates the characteristic of the vibration body that is provided with the piezoelectric device 2a of the thickness t1, and a broken line indicates the characteristic of the vibration body that is provided with the piezoelectric device 2a of the thickness t2. The relation t1<t2 holds.

There are three peaks in the admittance characteristic of the vibration body 2 with the piezoelectric device 2a of the thickness t1, as shown by the solid line. The frequencies fa, fb, and fc respectively indicate the resonance frequencies in the first, second, and third vibration modes. Similarly, there are three peaks in the admittance characteristic of the vibration body 2 with the piezoelectric device 2a of the thickness t2, as shown by the broken line. The frequencies fa2, fb2, and fc2 respectively indicate the resonance frequencies in the first, second, and third vibration modes. The resonance frequencies in these three vibration modes increase as the thickness t of the piezoelectric device 2a increases, and the amount of change becomes largest in the third vibration mode. This is because the effects due to the increase in the thickness t of the piezoelectric device 2a differ for the deformations in the three vibration modes.

As the thickness t of the piezoelectric device 2a increases, the frequency difference between the resonance frequencies in the first and second vibration modes and the resonance frequency in the third vibration mode increases. That is, the frequency difference in the case where the thickness t of the piezoelectric device 2a is t2 becomes larger than that in the case of the thickness t1. Accordingly, when the thickness t of the piezoelectric device 2a increases, the resonance frequencies in the first vibration mode and second vibration mode for driving the vibration-type actuator 10 approach the driving frequency fd, and the resonance frequency in the third vibration mode goes away from the driving frequency fd on the contrary. That is, even if the vibration-type actuator 10 is driven at any frequency within the driving frequency range in the state where the vibration body 2 is in pressure contact with the driven body 3, the frequency difference f3 tends to be larger than the frequency differences f1 and f2. Accordingly, the vibration in the third vibration mode that is an unnecessary vibration is reduced, which enables to drive the vibration-type actuator 10 stably without causing the squeal.

When the frequency difference f3 is larger than the frequency differences f1 and f2 due to the thickness t of the piezoelectric device 2a, even if the pressure force P1 decreases to some extent, the frequency difference f3 keeps being larger than the frequency differences f1 and f2. Accordingly, the frictional wear in the sliding surfaces of the projection 2c and the driven body 3 is reduced, and durability performance is improved. Moreover, when the frequency difference f3 is larger than the frequency differences f1 and f2 due to the thickness t of the piezoelectric device 2a, even if the voltage value V1 increases to increase the vibration amplitude, the frequency difference f3 keeps being larger than the frequency differences f1 and f2. Accordingly, the output of the vibration-type actuator 10 is improved.

As mentioned above, at least one of the voltage value V1, the pressure force P1, and the thickness t of the piezoelectric device 2a is set up so that the frequency difference f3 is always larger than the frequency differences f1 and f2 in the driving frequency range of the vibration-type actuator 10 in the first embodiment. Accordingly, the vibration in the third vibration mode that is an unnecessary vibration is reduced and generation of a squeal is reduced, which enables stable driving.

Next, a second embodiment of the present invention will be described. The second embodiment is different from the first embodiment in that the configuration of the elastic body 2b constituting the vibration body 2 described in the first embodiment is modified. Accordingly, this different point will be described, and the description that overlaps with the first embodiment will be omitted.

Figure 11:
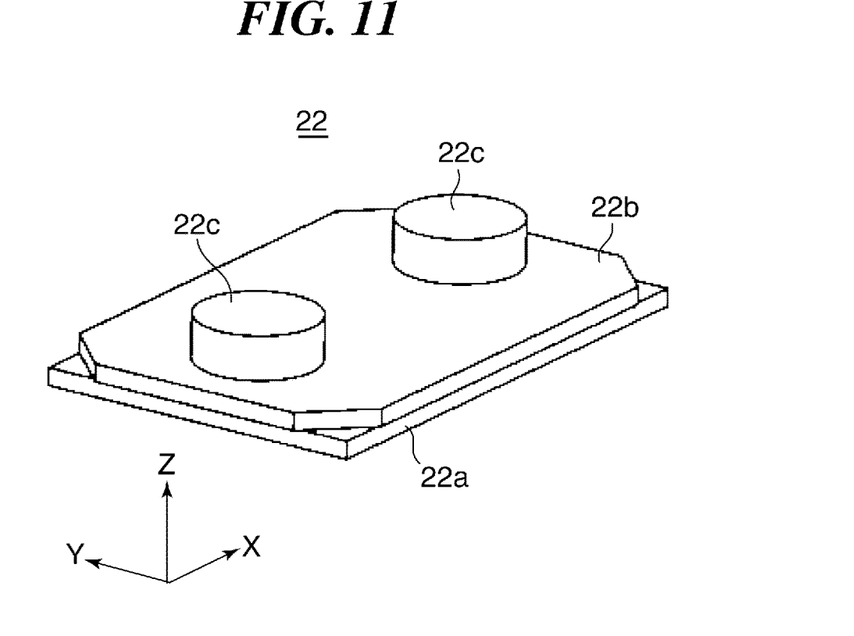
FIG. 11 is a perspective view schematically showing a configuration of a vibration-type actuator according to a second embodiment of the present invention.

FIG. 11 is a perspective view schematically showing a configuration of a vibration body 22 constituting a vibration-type actuator according to the second embodiment of the present invention. The vibration body 22 has an elastic body 22b, two projections 22c disposed on one side of the elastic body 22b, and a piezoelectric device 22a disposed to the elastic body 22b at the side opposite to the side on which the projections 22c are disposed. Since the projections 22c and the piezoelectric device 22a are equivalent to the projections 2c and the piezoelectric device 2a described in the first embodiment, their descriptions are omitted. The elastic body 22b is shaped so as to remove four corners of the elastic body 22b corresponding to portions at which amplitude becomes large when the vibration in the third vibration mode occurs.

Figure 12:
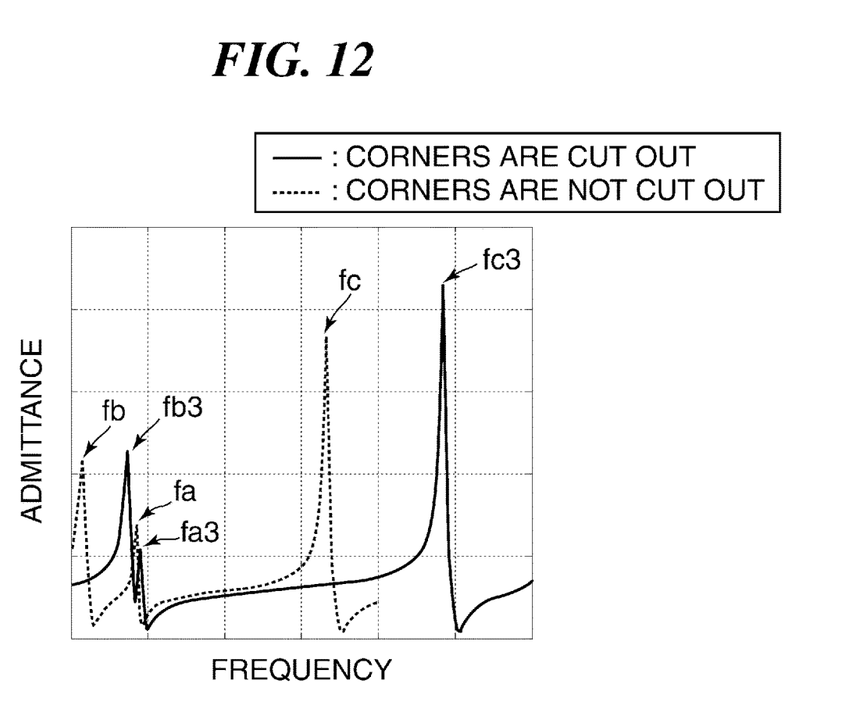
FIG. 12 is a graph showing a frequency-admittance characteristic that appears when a frequency of driving voltage applied to a piezoelectric device is swept in a non-pressure state of one vibration body in FIG. 11.

FIG. 12 is a graph showing a frequency-admittance characteristic that appears when the frequency of the driving voltage applied to the piezoelectric device 22a is swept in the non-pressure state of one vibration body 22. The frequency-admittance characteristic of the vibration body 22 (the second embodiment (no corners)) is shown by a solid line in FIG. 12. It should be noted that the frequency-admittance characteristic of the vibration body 2 (see FIG. 3, etc.) of which the four corners are not removed in the same condition is shown by a broken line in FIG. 12 for a purpose of comparison.

There are three peaks in the admittance characteristic even in the case where the four corners are removed as the elastic body 22b. The frequencies fa3, fb3, and fc3 respectively indicate the resonance frequencies in the first, second, and third vibration modes.

The resonance frequencies in the first, second, and third vibration modes become higher by removing the corners of the elastic body, and the amount of change in the third vibration mode is largest. This is because the four corners of the elastic body are close to antinodes in the third vibration mode (see FIG. 5) and the effect of presence/absence of the four corners of the elastic body appears largely in the third vibration mode.

Accordingly, the frequency difference between the resonance frequencies in the first and second vibration modes and the resonance frequency in the third vibration mode of the vibration body 22 that has the elastic body 22b without corners becomes larger than that of the vibration body 2 described in the first embodiment. Accordingly, the resonance frequencies in the first vibration mode and second vibration mode for driving the vibration-type actuator approach the driving frequency fd, and the resonance frequency in the third vibration mode goes away from the driving frequency fd on the contrary. That is, even if the vibration-type actuator is driven at any frequency within the driving frequency range in the state where the vibration body 22 is in pressure contact with the driven body 3, the frequency difference f3 tends to be larger than the frequency differences f1 and f2. Accordingly, the vibration in the third vibration mode that is an unnecessary vibration is reduced, which enables to drive the vibration-type actuator stably without causing the squeal.

In the vibration-type actuator using the vibration body 22, since the frequency difference f3 is always larger than the frequency differences f1 and f2 even if the pressure force P1 decreases, the frictional wear in the sliding surfaces of the projection 22c and the driven body is reduced, and the durability performance is improved. Furthermore, in the vibration-type actuator using the vibration body 22, even when the voltage value V1 increases and the vibration amplitude is enlarged, the frequency difference f3 is always larger than the frequency differences f1 and f2. Accordingly, the output of the vibration-type actuator is improved.

As mentioned above, the elastic body 22b constituting the vibration body 22 is shaped so that the frequency difference f3 is always larger than the frequency differences f1 and f2 in the driving frequency range of the vibration-type actuator in the second embodiment. Accordingly, the vibration in the third vibration mode that is an unnecessary vibration is reduced and generation of a squeal is reduced, which enables stable driving.

Although the corners of the elastic body 22b are removed (are cut out) along the straight lines in the second embodiment, it is not limited to this. The corners of the elastic body 22b may be cut out (may be formed) circularly. Moreover, the four corners of the piezoelectric device 22a may be removed similarly. And the four corners of the elastic body 22b and the four corners of the piezoelectric device 22a may be removed.

Figure 13A:
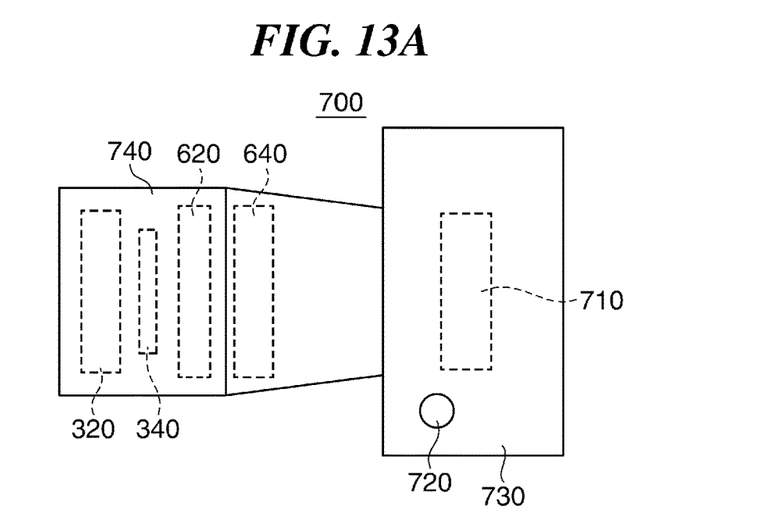
FIG. 13A is a top plan view schematically showing a configuration of an image pickup apparatus that employs the vibration-type actuator shown in FIG. 1.

Next, a third embodiment of the present invention will be described. In the third embodiment, a configuration of an image pickup apparatus will be described as an example of an apparatus (a machine) equipped with the vibration-type actuator 10. FIG. 13A is a top plan view schematically showing the configuration of the image pickup apparatus 700. The image pickup apparatus 700 is provided with a camera body 730 in which an image pickup device 710 and a power button 720 are disposed. Moreover, the image pickup apparatus 700 is provided with a lens barrel 740 equipped with a first lens group (not shown), a second lens group 320, a third lens group (not shown), a fourth lens group 340, and vibration-type actuators 620 and 640. The lens barrel 740 is exchangeable as an interchangeable lens, and the lens barrel 740 that is suitable to a photographing object is attached to the camera body 730.

The image pickup apparatus 700 drives the second lens group 320 and fourth lens group 340 by the two vibration-type actuators 620 and 640. The above-mentioned vibration-type actuator 10 is used for each of the vibration-type actuators 620 and 640. That is, each of the vibration-type actuators 620 and 640 is configured by arranging the vibration-type actuator 10 so that the center axis of the vibration-type actuator 10 is approximately parallel to an optical axis. The second lens group 320 and the fourth lens group 340 are moved in an optical axis direction by converting the rotation output (driving force) of the vibration-type actuator 10 into a linear movement in the optical axis direction through a one-dimensional moving mechanism including a gear and a cam barrel.

Figure 13B:
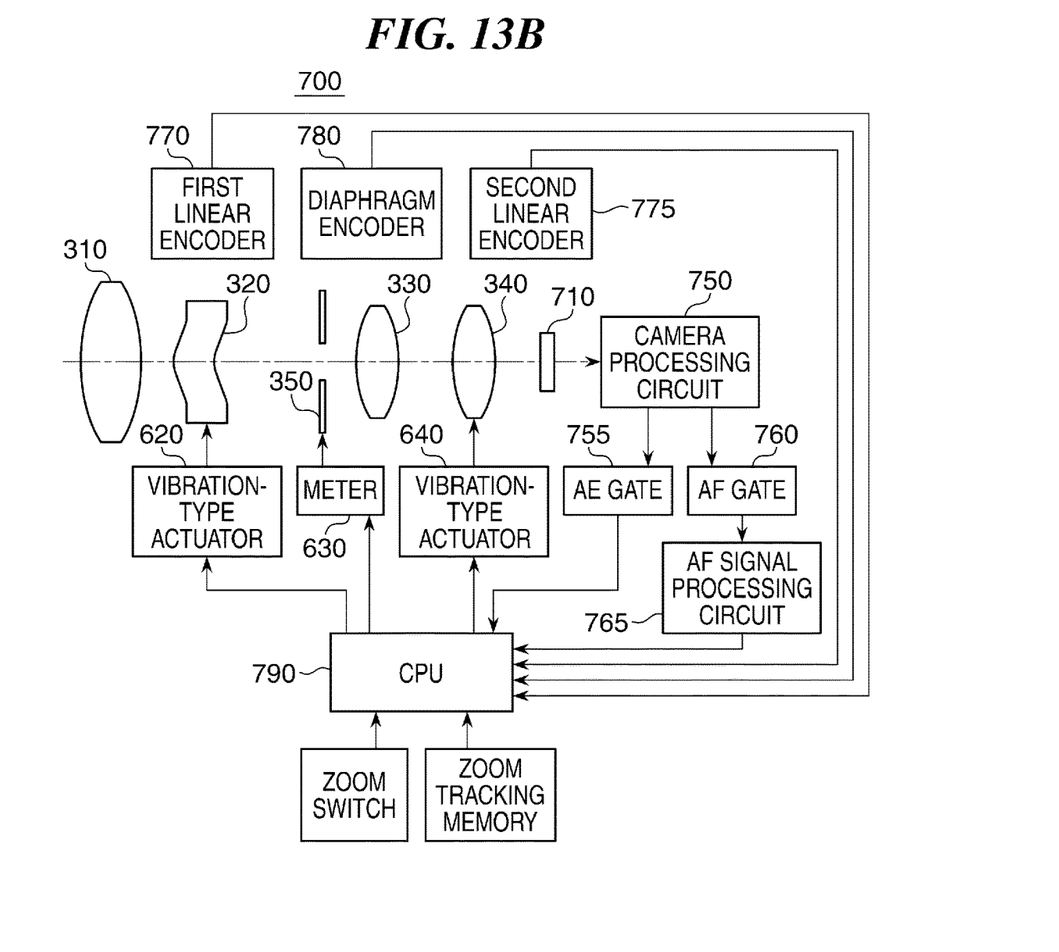
FIG. 13B is a block diagram schematically showing a configuration of the image pickup apparatus shown in FIG. 13A.

FIG. 13B is a block diagram schematically showing the configuration of the image pickup apparatus 700. The first lens group 310, the second lens group 320, the third lens group 330, the fourth lens group 340, and a light amount adjustment unit 350 are arranged at predetermined positions on the optical axis inside the lens barrel 740. Light that passes through the first lens group 310, second lens group 320, third lens group 330, fourth lens group 340, and light amount adjustment unit 350 forms an image on the image pickup device 710. The image pickup device 710 converts an optical image into an electrical signal and outputs it. The output is sent to a camera processing circuit 750.

The camera processing circuit 750 applies amplification, gamma correction, etc. to the output signal from the image pickup device 710. The camera processing circuit 750 is connected to a CPU 790 through an AE gate 755, and is connected to the CPU 790 through an AF gate 760 and AF signal processing circuit 765. A video signal to which a predetermined process was applied by the camera processing circuit 750 is sent to the CPU 790 through the AE gate 755, and through the AF gate 760 and AF signal processing circuit 765. It should be noted that the AF signal processing circuit 765 extracts a high frequency component from the video signal, generates an evaluation value signal for auto focus (AF), and supplies the generated evaluation value signal to the CPU 790.

The CPU 790 is a control circuit that controls the entire operation of the image pickup apparatus 700, and generates the control signals for exposure determination or focusing on the basis of the obtained video signal. The CPU 790 adjusts the positions of the second lens group 320, fourth lens group 340, and light amount adjustment unit 350 in the optical axis direction by drivingly controlling the vibration-type actuators 620 and 640 and a meter 630 so that the determined exposure and the suitable focus condition are obtained. Under the control by the CPU 790, the vibration-type actuator 620 moves the second lens group 320 in the optical axis direction, the vibration-type actuator 640 moves the fourth lens group 340 in the optical axis direction, and the light amount adjustment unit 350 is controlled by the meter 630.

The position of the second lens group 320 in the optical axis direction that is driven by the vibration-type actuator 620 is detected by a first linear encoder 770. A detection result is given to the CPU 790 and is fed back to the driving of the vibration-type actuator 620. Similarly, the position of the fourth lens group 340 in the optical axis direction that is driven by the vibration-type actuator 640 is detected by a second linear encoder 775. A detection result is given to the CPU 790 and is fed back to the driving of the vibration-type actuator 640. The position of the light amount adjustment unit 350 in the optical axis direction is detected by a diaphragm encoder 780. A detection result is given to the CPU 790, and is fed back to the driving of the meter 630.

When the vibration-type actuator 10 is used for moving a predetermined lens group of the image pickup apparatus 700 in the optical axis direction, large holding force is maintained even in a state where the lens group is stopped. This prevents the lens group from generating displacement due to external force that acts on the lens barrel or the camera body.

Although the example that moves the lens groups in the optical axis direction using the ring-shaped vibration-type actuator 10 is described in the third embodiment, the configuration that moves the lens groups in the optical axis direction using the vibration body 2 is not limited to this. For example, the vibration body 2 is able to move the driven body in the X-direction that connects the two projections. Accordingly, a holding member holding a lens is used as the driven body, and one or more vibration bodies 2 are held on a base so that the optical axis direction of the lens, the driving direction of the driven body, and the X-direction of the vibration body 2 become parallel mutually.

Moreover, when the lens barrel includes an image stabilization lens, the vibration body unit S1 of which a shape and driving condition are designed so as to reduce unnecessary vibration may be employed in an image stabilization unit that moves the image stabilization lens in any directions in a plane that intersects approximately perpendicularly with the optical axis. In this case, a lens holding member holding the image stabilization lens acts as the driven body (two-dimensional moving mechanism). Then, the vibration bodies 2 and 22 that supply driving force to the lens holding member are arranged for two directions so that the lens holding member material is movable in the two directions that intersect perpendicularly mutually in the plane that intersects approximately perpendicularly with the optical axis. It should be noted that the image stabilization unit may be configured to move the image pickup device 710 built in the camera body in any directions in the plane that intersects approximately perpendicularly with the optical axis in place of the configuration that drives the image stabilization lens.

Figure 14:
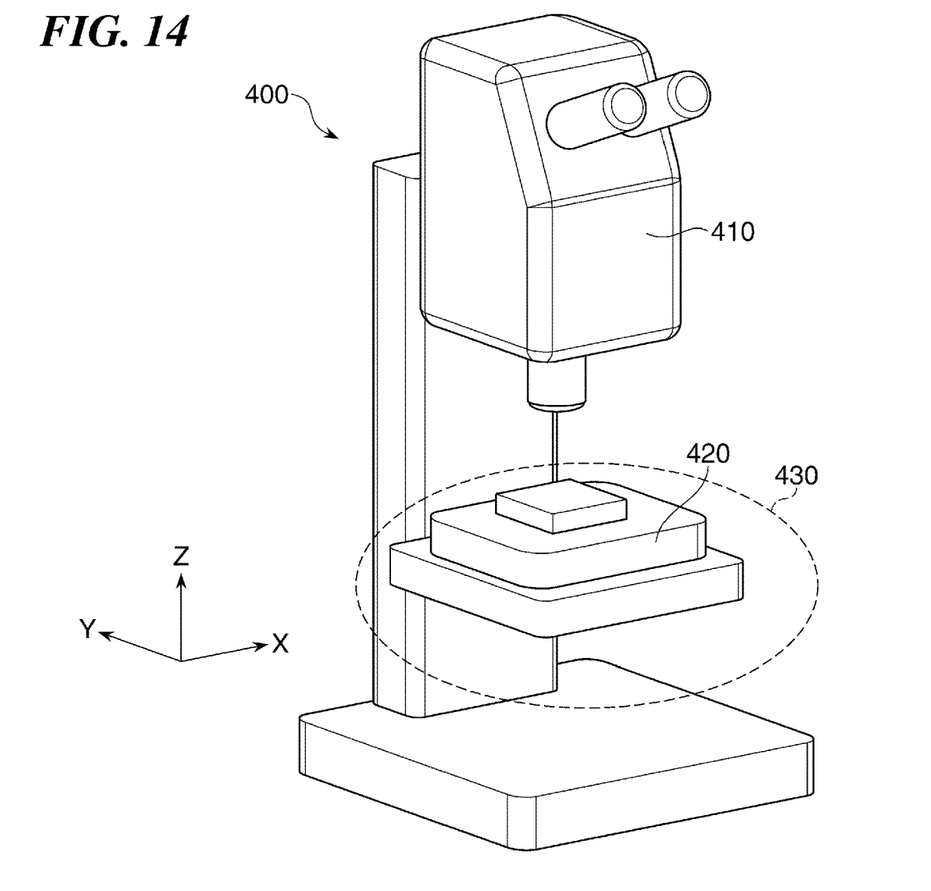
FIG. 14 is an external perspective view of a microscope that employs the vibration-type actuator shown in FIG. 1.

Next, a fourth embodiment of the present invention will be described. In the fourth embodiment, a configuration of a microscope equipped with an X-Y stage as an example of an apparatus equipped with the vibration-type actuator concerning each of the embodiments mentioned above will be described. FIG. 14 is an external perspective view of the microscope 400. The microscope 400 is provided with an image pickup unit 410 and an automatic stage 430. The image pickup unit 410 includes an image pickup device and an optical system. The automatic stage 430 is an example of a stage apparatus having a stage 420 that is disposed on a base and is moved in the X-Y plane by the vibration-type actuator. The stage 420 is held movably in the X-Y plane by a stage moving mechanism (not shown). At least two actuators each of which is configured to hold the vibration body 2 by the base are employed as the vibration-type actuators that supply the driving force to the stage moving mechanism. At least one vibration-type actuator is used for driving the stage 420 in the X-direction, and is arranged so that the X-direction of the vibration body 2 is coincident with the X-direction of the stage 420. At least one another vibration-type actuator is used for driving the stage 420 in the Y-direction, and is arranged so that the X-direction of the vibration body 2 is coincident with the Y-direction of the stage 420.

For example, an observation object is put on the upper surface of the stage 420, and an enlarged image is taken by the image pickup unit 410. When an observation area is wide, many taken images are obtained while moving the observation object by driving the automatic stage 430 to move the stage 420 in the X-direction or the Y-direction in the plane. When the taken images are combined by an image process with a computer (not shown), one image with the wide area and high definition is obtained. The applications of the vibration-type actuators concerning the embodiments are not limited to the apparatus mentioned above. They are able to be widely applied to an electronic apparatus equipped with a component that needs positioning by driving.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-194141, filed Sep. 30, 2015, which is hereby incorporated by reference herein in its entirety.

What is claimed is:

1. A driving method for a vibration-type actuator that has a vibration body, which has an electro-mechanical energy conversion element and an elastic body, and a driven body that is in contact with the vibration body, the driving method comprising:
   a step of applying a driving voltage, which has a frequency fd within a driving frequency range, to the electro-mechanical energy conversion element; and
   a step of determining a voltage value of the driving voltage so that a difference between a resonance frequency in a natural vibration mode of the vibration body that is higher than an upper limit frequency fs of the driving frequency range and that is nearest to fs and fd is greater than a difference between a resonance frequency in a natural vibration mode used for moving the vibration body and the driven body relatively and fd.

2. The driving method according to claim 1, wherein two different natural vibration modes of the vibration body are used for relative movement of the vibration body and the driven body, and
   wherein the difference between the resonance frequency in the natural vibration mode of the vibration body that is higher than fs and that is nearest to fs and fd is greater than a difference between each of resonance frequencies in the two different natural vibration modes and the frequency fd of the driving voltage.

3. The driving method according to claim 2, wherein admittance at a time when the driving voltage is applied at the resonance frequency in the natural vibration mode of the vibration body that is higher than fs and that is nearest to fs is larger than admittance at a time when the driving voltage is applied at the resonance frequency in at least one of the two different natural vibration modes.

4. The driving method according to claim 1, wherein the vibration-type actuator further has a pressure member that makes the driven body and the vibration body contact each other with a predetermined pressure force,
   wherein the elastic body has an approximately rectangular tabular shape, and at least one projection that is in contact with the driven body is disposed on the elastic body at the side opposite to the side to which the electro-mechanical energy conversion element is connected, and
   wherein the pressure force of the pressure member is determined so that the difference between the resonance frequency in the natural vibration mode of the vibration body that is higher than fs and that is nearest to fs and fd is greater than a difference between a resonance frequency in a natural vibration mode used for moving the vibration body and the driven body relatively and the frequency fd of the driving voltage.

5. The driving method according to claim 1, wherein the elastic body has an approximately rectangular tabular shape, and the electro-mechanical energy conversion element is a piezoelectric device that has an approximately rectangular tabular shape,
   wherein at least one projection that is in pressure contact with the driven body is disposed on the elastic body at the side opposite to the side to which the electro-mechanical energy conversion element is connected, and
   wherein a thickness of the piezoelectric device is determined so that the difference between the resonance frequency in the natural vibration mode of the vibration body that is higher than fs and that is nearest to fs and fd is greater than a difference between a resonance frequency in a natural vibration mode used for moving the vibration body and the driven body relatively and the frequency fd of the driving voltage.

6. The driving method according to claim 1, wherein the elastic body has an approximately rectangular tabular shape, and the electro-mechanical energy conversion element is a piezoelectric device that has an approximately rectangular tabular shape, and
   wherein at least one projection that is in pressure contact with the driven body is disposed on the elastic body at the side opposite to the side to which the electro-mechanical energy conversion element is connected.

7. The driving method according to claim 1, wherein corners of the elastic body are cut out.

* * * * *